US010697997B2

(12) United States Patent
Arai

(10) Patent No.: US 10,697,997 B2
(45) Date of Patent: Jun. 30, 2020

(54) SCANNING PROBE MICROSCOPE

(71) Applicant: Shimadzu Corporation, Kyoto (JP)

(72) Inventor: Hiroshi Arai, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/302,759

(22) PCT Filed: Jun. 2, 2016

(86) PCT No.: PCT/JP2016/066338
§ 371 (c)(1),
(2) Date: Nov. 19, 2018

(87) PCT Pub. No.: WO2017/208412
PCT Pub. Date: Dec. 7, 2017

(65) Prior Publication Data
US 2019/0293680 A1 Sep. 26, 2019

(51) Int. Cl.
*G01Q 10/06* (2010.01)
*G01B 5/20* (2006.01)
(Continued)

(52) U.S. Cl.
CPC .............. *G01Q 10/06* (2013.01); *G01B 5/20* (2013.01); *G01Q 20/02* (2013.01); *G01Q 30/06* (2013.01); *G01Q 30/18* (2013.01)

(58) Field of Classification Search
CPC ........ G01Q 10/06; G01Q 20/02; G01Q 30/06; G01Q 30/18; G01B 5/20
(Continued)

(56) References Cited

U.S. PATENT DOCUMENTS 5,414,260 A    5/1995  Takimoto et al.
5,448,399 A *  9/1995  Park ....................... G01Q 20/02
                                                  359/227
(Continued)

FOREIGN PATENT DOCUMENTS

JP    H05-306926 A    11/1993
JP    H10-260360 A     9/1998
(Continued)

OTHER PUBLICATIONS

International Preliminary Report on Patentability dated Dec. 4, 2018 of corresponding application No. PCT/JP2016/066338; 13 pgs.
(Continued)

*Primary Examiner* — Nicole M Ippolito
(74) *Attorney, Agent, or Firm* — Maier & Maier, PLLC

(57) ABSTRACT

When trace image data is obtained while a probe is used to scan a region on a sample in a forward direction and retrace image data is obtained while the same region is scanned in the reverse direction, a deviation information storage unit stores deviation detected by a deviation detection unit. This deviation is an indication of the difference between the distance between the probe and the sample and a target value for the distance at a given point in time. An image data selection unit compares the deviation during forward scanning and the deviation during reverse scanning for each measurement point, selects the image data obtained during scanning that has the smaller deviation, and stores the same to a storage region of an image data storage unit as selected image data.

5 Claims, 5 Drawing Sheets

(51) Int. Cl.
  *G01Q 20/02* (2010.01)
  *G01Q 30/06* (2010.01)
  *G01Q 30/18* (2010.01)

(58) Field of Classification Search
  USPC .................................. 850/1, 2, 3, 4, 5, 6, 7
  See application file for complete search history.

(56) References Cited

U.S. PATENT DOCUMENTS

| | | | | |
|---|---|---|---|---|
| 6,057,547 | A * | 5/2000 | Park | B82Y 35/00 850/10 |
| 8,796,654 | B2 * | 8/2014 | Ohta | B82Y 35/00 250/206 |
| 2007/0033991 | A1 * | 2/2007 | Rice | B82Y 35/00 73/105 |
| 2017/0074901 | A1 * | 3/2017 | Humphris | G01Q 10/045 |

FOREIGN PATENT DOCUMENTS

| | | |
|---|---|---|
| JP | 2006-105684 A | 4/2006 |
| JP | 2011-13185 A | 1/2011 |

OTHER PUBLICATIONS

Written Opinion of the International Searching Authority dated Aug. 9, 2016 of corresponding application No. PCT/JP2016/066338; 12 pgs.

International Search Report with English Translation and Written Opinion dated Aug. 9, 2016 of corresponding application No. PCT/JP2016/066338;10 pgs.

"SPM Sample Room Fundamental Knowledge Q&A", [online], [searched on Jun. 2, 2016], Shimadzu Corporation, the Internet <URL: http://www.an.shimadzu.co.jp/surface/spm/sol/faq/faq1.htm#spm1-2>, 6 pgs.

* cited by examiner

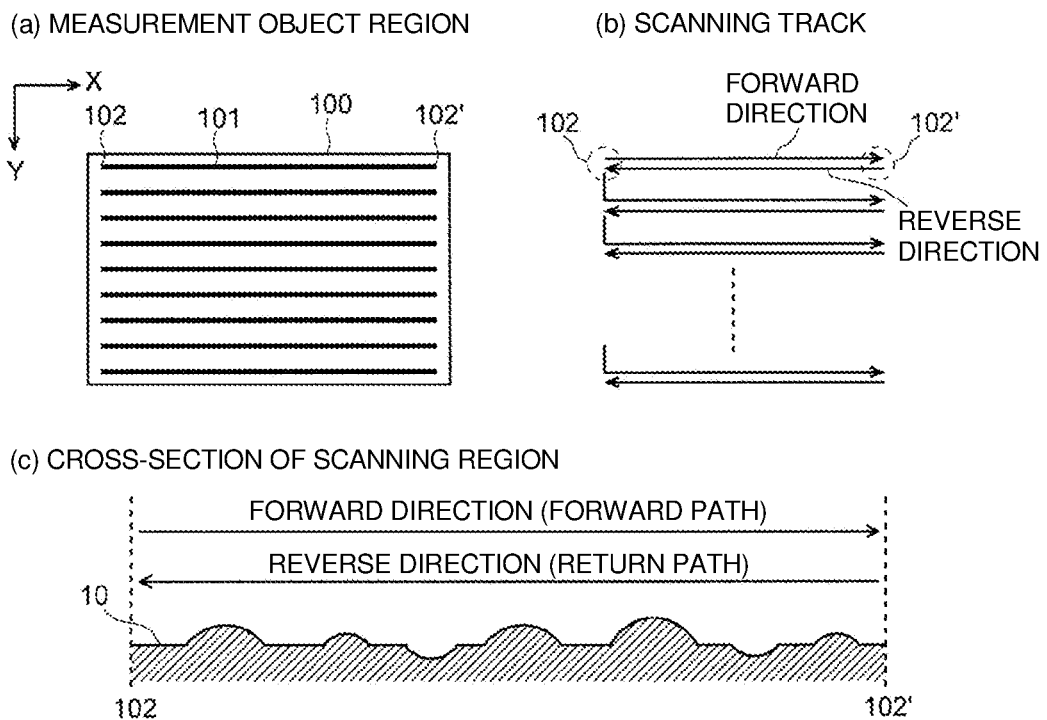
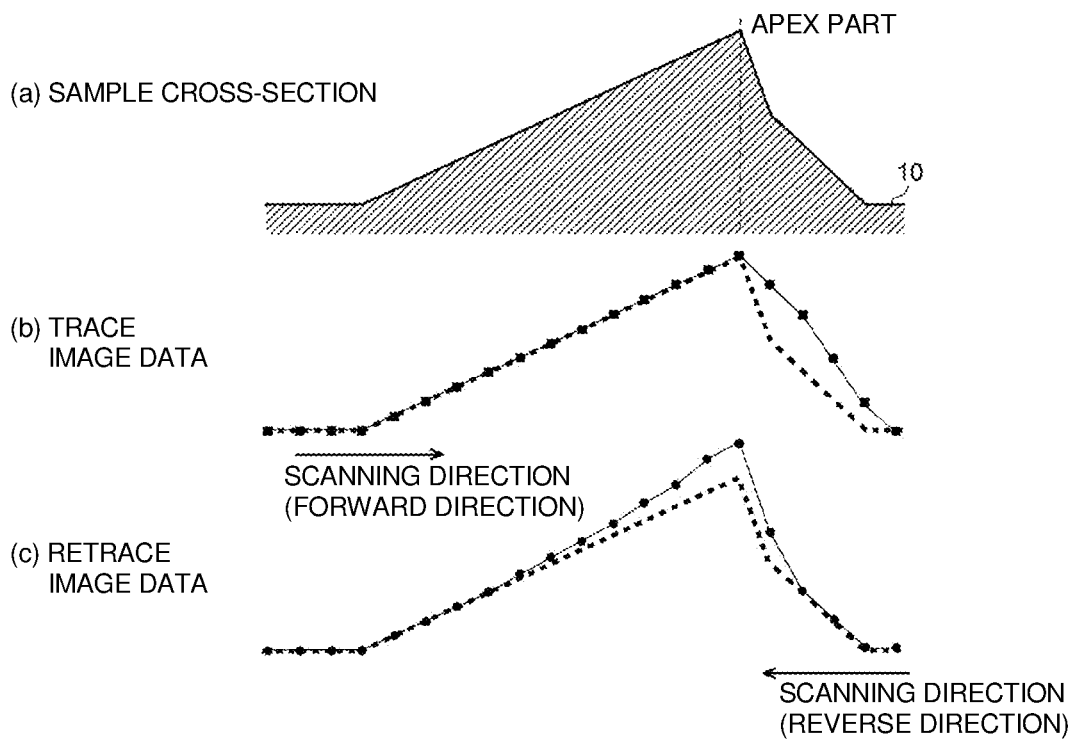

Fig. 4
(a) DEVIATION DATA
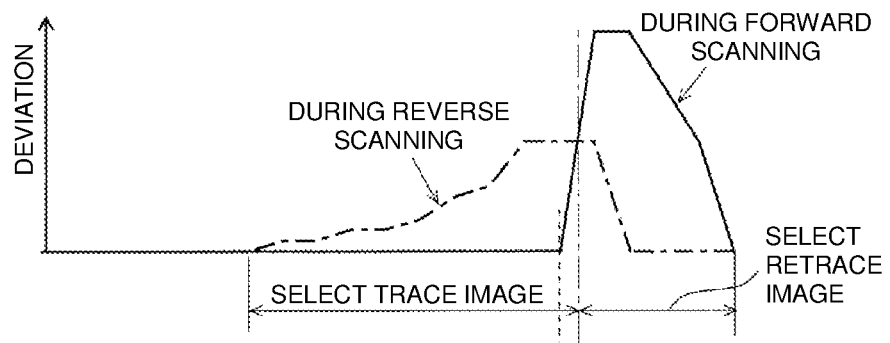
(b) SELECTED IMAGE DATA
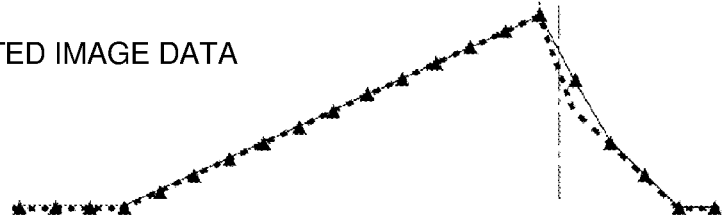

SCANNING PROBE MICROSCOPE

FIELD

The present invention relates to a scanning probe microscope, and more particularly to a technique of processing image data that reflects a sample surface shape obtained in the scanning probe microscope.

BACKGROUND

A scanning probe microscope (Scanning Probe Microscope, hereinafter abbreviated as "SPM") is a device in which a tip end of a tiny measurement probe (probe) is brought closer to a sample surface, and the sample surface is scanned with the probe while a mechanical or electrical interaction between the probe and the sample is being detected, thereby to observe the shape of the sample surface, the distribution of the electrical characteristics, and the like. In an atomic force microscope (Atomic Force Microscope, hereinafter abbreviated as "AFM") which is a typical SPM, an interatomic force is measured as the interaction that acts between the probe and the sample surface (see, for example, Non Patent Literature 1).

An AFM is normally provided with a scanner that moves a sample in three axial directions of X, Y, and Z that are orthogonal to each other (here, it is assumed that the X-axis and the Y-axis are taken in a plane on which the sample is mounted, and the Z-axis is taken in the direction that is orthogonal to the plane), a cantilever that is disposed at a position distant from the sample in the Z-axis direction and that has a probe attached to the tip end, and a displacement detection unit for detecting the deflection of the cantilever, where the tip end of the probe is brought extremely close (with a spacing of about several nm or less) to the sample. At this time, an interatomic force (attractive force or repulsive force) acts between the probe and the sample. When the scanner is driven along the sample surface, that is, so that the probe and the sample move relative to each other in the two axial directions of X-axis and Y-axis while keeping this interatomic force constant, the cantilever is displaced in the Z-axis direction in accordance with the elevation of the sample surface. The amount of spacing is detected by the displacement detection unit, and the scanner is subjected to feedback control so as to finely move the sample in the Z-axis direction so that the spacing may be kept constant. The control amount for this feedback control reflects the elevation of the sample surface, so that this control amount is taken into the data processing unit and processed, thereby to prepare a sample surface image to be displayed.

There are several operation modes for the AFM. Typical modes are a contact mode and a non-contact (dynamic) mode. In the contact mode, a bend caused in the cantilever by the repulsive force that acts between the probe and the sample surface when the probe is brought close to the sample is detected, and the scanner is subjected to feedback control so that the amount of the bend be kept constant. On the other hand, in the dynamic mode, the cantilever brought close to the sample surface is vibrated at a frequency around its resonance point. The amplitude of vibration changes mainly by an attractive force that acts between the probe and the sample surface. The scanner is subjected to feedback control so that the amplitude of this vibration be kept constant. In either mode, the operation is common in that the sample surface image is created by using the control amount for the feedback control.

However, if a steep change in the elevation is present on a sample surface when the sample surface is scanned with the probe, tracking delay may be generated or the tracking cannot be made in the feedback control of the scanner, so that a temporary disturbance may be generated in the feedback control. In such a case, the image data obtained based on the control amount for the feedback control may become inaccurate, and does not reflect the actual shape of the surface of the sample.

Usually, the SPM is used in such a manner that, when the sample surface is scanned with the probe, the same one-dimensional region is scanned for two times, that is, in the forward direction and in the reverse direction (in other words, reciprocal scanning is made), so as to collect image data independently. The forward scanning is referred to as trace, whereas the reverse scanning is referred to as retrace. One of the big reasons for carrying out such reciprocal scanning is that there is a difference in the shape of the tip end of probe or in the spring constant of the cantilever depending on the scanning direction, so that, even when the sample surface is appropriately scanned, different image data may be obtained in the trace and in the retrace. For this reason, a sample surface image is often created by taking an average of the image data obtained in the trace (which is hereinafter referred to as "trace image data") and the image data obtained in the retrace (which is hereinafter referred to as "retrace image data").

In the SPM disclosed in Patent Literature 1, characteristic data processing is carried out using the trace image data and the retrace image data described above in order to create an accurate sample surface image even when there is a steep change in the elevation of the sample surface. Specifically, the trace image data and the retrace image data obtained by scanning the same region are compared, and a part in which the data should be replaced is automatically recognized, for example, in the trace image data (or in the retrace image data), and data processing is carried out to replace the data of that part with the retrace image data (or trace image data). Also, Patent Literature 1 proposes another technique in which a part where the value of the trace image data (or retrace image data) exceeds a predetermined threshold is detected, and the data of that part is replaced with the retrace image data (or trace image data).

However, such a data processing technique raises the following problem. In Patent Literature 1, when a steep protrusion, for example, is present on the sample surface, the trace image data and the retrace image data are compared to choose the less accurate image data on the assumption that the feedback control is tracked properly on an upward slope prior to the apex part of the protrusion, and the feedback control is disturbed after passing the apex part, that is, after the upward slope is sharply changed to a downward slope. However, the assumption may not be always true depending on the shape of the protrusion, such as for a protrusion having one side steep and the other side moderate, or a protrusion having a trapezoid form with an almost flat top. For this reason, there are cases in which the less accurate one of the trace image data and the retrace image data may be selected, so that an accurate sample surface image may not be obtained.

Also, when a value of the trace image data exceeds a predetermined threshold in a certain part, it is not always true that the retrace image data obtained in that part represents the sample surface shape more accurately. Accordingly, even when said another technique disclosed in Patent Literature 1 is used, there are cases in which the less accurate one of the trace image data and the retrace image data may be selected, so that an accurate sample surface image may not be obtained, either.

Patent Literature 1: JP 2006-105684 A

NON PATENT LITERATURE

Non Patent Literature 1: "SPM Sample Room Fundamental Knowledge Q&A", [online], [searched on Jun. 2, 2016], Shimadzu Corporation, the Internet.

SUMMARY

That is, by the technique disclosed in Patent Literature 1, the data closer to the actual shape of the surface of the sample may not be always selected, thereby raising a problem in that it is not possible to obtain an accurate sample surface image depending on the state of the surface elevation of the sample.

The present invention has been made in order to solve such a problem, and a principal object is to provide a scanning probe microscope in which, even when a steep change in the surface elevation that generates tracking delay or disturbance in the feedback control in the Z-axis direction is present on the sample, it is possible to obtain a highly precise image reflecting the shape of the sample surface.

The present invention made in order to solve the aforementioned problem is directed to a scanning probe microscope including a cantilever provided with a probe and a displacement detection unit for detecting displacement of the cantilever, the scanning probe microscope configured to, in a state in which the probe is brought close to a surface of a sample, scan a measurement object region on the sample with the probe while performing feedback control of a spacing distance between the probe and the sample so that an interaction between the probe and the sample is kept constant based on the displacement detected by the displacement detection unit, to obtain a surface shape image of the region, wherein the scanning probe microscope includes:
a) a data obtaining unit for obtaining image data in a forward scanning and image data in a reverse scanning by moving a relative position of the probe and the sample so as to scan a predetermined one-dimensional region in the measurement object region on the sample in a forward direction and in a reverse direction, respectively;
b) a reference information obtaining unit for obtaining, as reference information, at least one of a deviation between a displacement amount obtained based on the displacement detection unit and a target value, and a signal value reflecting physical property information of the sample surface obtained based on the displacement amount in a control loop of the feedback control in obtaining the image data by the data obtaining unit; and
c) an image data selection processing unit for determining the image data corresponding to the measurement object region by executing, at each of measurement points in the measurement object region, a process of comparing the reference information obtained during the forward scanning and the reference information obtained during the reverse scanning at each measurement point, and selecting the image data obtained during scanning in which a value indicated by the reference information is smaller.

For example, when the scanning probe microscope according to the present invention is an atomic force microscope, the interaction between the probe and the sample is an interatomic force. At this time, when the operation mode for sample surface shape observation is the contact mode, the displacement amount obtained based on the displacement detection unit is a displacement amount indicating the amount of bend (deflection) of the cantilever. On the other hand, when the operation mode for sample surface shape measurement is the dynamic mode, the cantilever is vibrated at a predetermined frequency, so that the displacement amount obtained based on the displacement detection unit is a displacement amount indicating an amount of change in the vibration amplitude of the cantilever.

In the scanning probe microscope of the first aspect according to the present invention, when sample surface shape observation by the contact mode is carried out, the reference information obtaining unit obtains, as the reference information, the deviation between the displacement amount obtained based on the displacement detection unit and its target value. Normally, the feedback control of the spacing distance between the probe and the sample is executed so that this deviation may become zero. At this time, the displacement amount showing the amount of bend of the cantilever at that time point is obtained in the displacement detection unit, so that the deviation between the displacement amount and the target value shows a difference between the distance between the position of the probe at that time point and the actual sample surface, which is unknown, and the target value of the distance (value of the distance that is aimed to be kept constant). When the feedback control is carried out properly, this difference is small; however, this difference increases when there is tracking delay or disturbance in the feedback control. Accordingly, the deviation is a kind of an index value reflecting a state of tracking delay or disturbance of the feedback control. Thus, the reference information obtaining unit obtains the deviation as reference information for each of the measurement points at which the image data is obtained by the data obtaining unit.

The image data selection unit compares the reference information obtained during the forward scanning and the reference information obtained during the reverse scanning at each measurement point after all the image data on the measurement object region is collected or in parallel with the collection of the image data, and determines which one of the values is the smaller. As described above, the smaller the deviation is, the less the influence of tracking delay or disturbance of the feedback control is, and hence the reliability of the obtained image data can be regarded as higher. Accordingly, the image data selection unit selects the image data in which a value indicated by the reference information is the smaller between the forward scanning and the reverse scanning, as the more accurate image data at the measurement point. The image data corresponding to the measurement object region is determined by executing a similar process for each measurement point in the measurement object region. The image data thus selected for each measurement point is stored separately, for example, from the image data during forward scanning or the image data during reverse scanning, whereby a sample surface shape image having a higher precision can be displayed at an arbitrary time point, for example, with less influence of tracking delay or disturbance of the feedback control caused by a steep change in the elevation of the sample.

When sample surface shape observation by the dynamic mode is carried out in the scanning probe microscope of the first aspect, the operation is the same as in the case of performing sample surface shape observation by the contact mode except that the displacement amount obtained based on the displacement detection unit is a vibration amplitude and that the target value of the displacement amount is the target value of not the deflection amount of the cantilever but the vibration amplitude.

In other words, the scanning probe microscope of the second aspect according to the present invention is characterized in that the sample surface shape observation is made by the dynamic mode, and the reference information obtaining unit obtains, as the reference information, a deviation between a vibration amplitude of a detection signal obtained based on the displacement detection unit and a target value of the amplitude when the cantilever is vibrated at a predetermined frequency.

Also, as is well known in the art, in the scanning probe microscope, various modes for obtaining various physical property information of the sample surface are prepared in addition to the mode of observing the recess/protrusion shape of the sample surface (see, for example, Non Patent Literature 1). A signal obtained in a part of such modes can be used in place of the aforementioned deviation.

Specifically, in the phase mode, when the cantilever is vibrated at a predetermined frequency in the dynamic mode, the amount of delay in the phase of a detection signal relative to a vibration signal is detected together with the amplitude of the vibration of the cantilever. Further, based on the phase delay amount, a phase image reflecting a distribution of viscoelasticity or the like on the sample surface is created. The larger the aforementioned difference between the actual distance and the target value of the distance is, the larger this phase delay amount is. Therefore, by using the phase delay amount obtained in the phase mode in place of the deviation, a more accurate one of the image data during forward scanning and the image data during reverse scanning can be selected.

In other words, the scanning probe microscope of the third aspect according to the present invention is characterized in that physical property information of the sample surface is obtained by the phase mode, and that the reference information obtaining unit obtains, as the reference information, a phase delay amount of a detection signal obtained based on the displacement detection unit relative to a vibration signal when the cantilever is vibrated at a predetermined frequency.

In a horizontal force mode, the horizontal force acting between the probe and the sample is detected by the torsion of the cantilever while the cantilever is relatively moved in a direction perpendicular to the longitudinal direction of the cantilever in the contact mode. Since this horizontal force mainly shows a frictional force, an image reflecting, for example, a distribution of the frictional force on the sample surface is created based on the obtained horizontal force. The larger the aforementioned difference between the actual distance and the target value of the distance is, the larger this horizontal force is. Therefore, by using the horizontal force obtained in the horizontal force mode in place of the deviation, a more accurate one of the image data during forward scanning and the image data during reverse scanning can be selected.

In normal scanning probe microscopes, various modes are prepared in addition to the phase mode and the horizontal force mode described above: for example, the force modulation mode, the electric current mode, the surface electric potential mode, and the like, which can be carried out in parallel with the sample surface shape observation in the contact mode or the dynamic mode. In these various modes, image data showing a distribution of the physical property information of the sample surface can be obtained. Regarding these data as well, the data is obtained for each of the forward scanning and the reverse scanning. Therefore, in the scanning probe microscope according to the present invention, not only the selection is made based on the reference information with respect to the image data showing the sample surface shape, but also the selection can be made based on the reference information with respect to the data obtained in the phase mode, the horizontal force mode, the force modulation mode, the electric current mode, the surface electric potential mode and the like described above.

This makes it possible to prepare and display a more accurate image with respect to, for example, the phase image obtained in the phase mode, the resistivity distribution image obtained in the electric current mode, and the like.

According to the scanning probe microscope of the present invention, even if there is a steep elevation change on a sample to cause a tracking delay or disturbance in the feedback control for the distance between the probe and the sample, it is possible to display a highly precise sample surface shape image closer to the actual shape of the surface of the sample.

BRIEF DESCRIPTION OF DRAWINGS

FIG. 2 is an explanatory view of a scanning region and a scanning order when an inside of a measurement object region on a sample is scanned with a probe in the SPM of the first embodiment.

FIG. 3 is a schematic diagram showing a state of image data obtained when a steep protrusion is present on the sample.

FIG. 4 is a schematic diagram showing deviation data obtained in parallel with image data obtainment of a sample surface shape and the image data selected on the basis of the deviation data in the SPM of the first embodiment.

DETAILED DESCRIPTION

First Embodiment

Hereinafter, the first embodiment of a scanning probe microscope (SPM) according to the present invention will be described with reference to the attached drawings.

Figure 1:
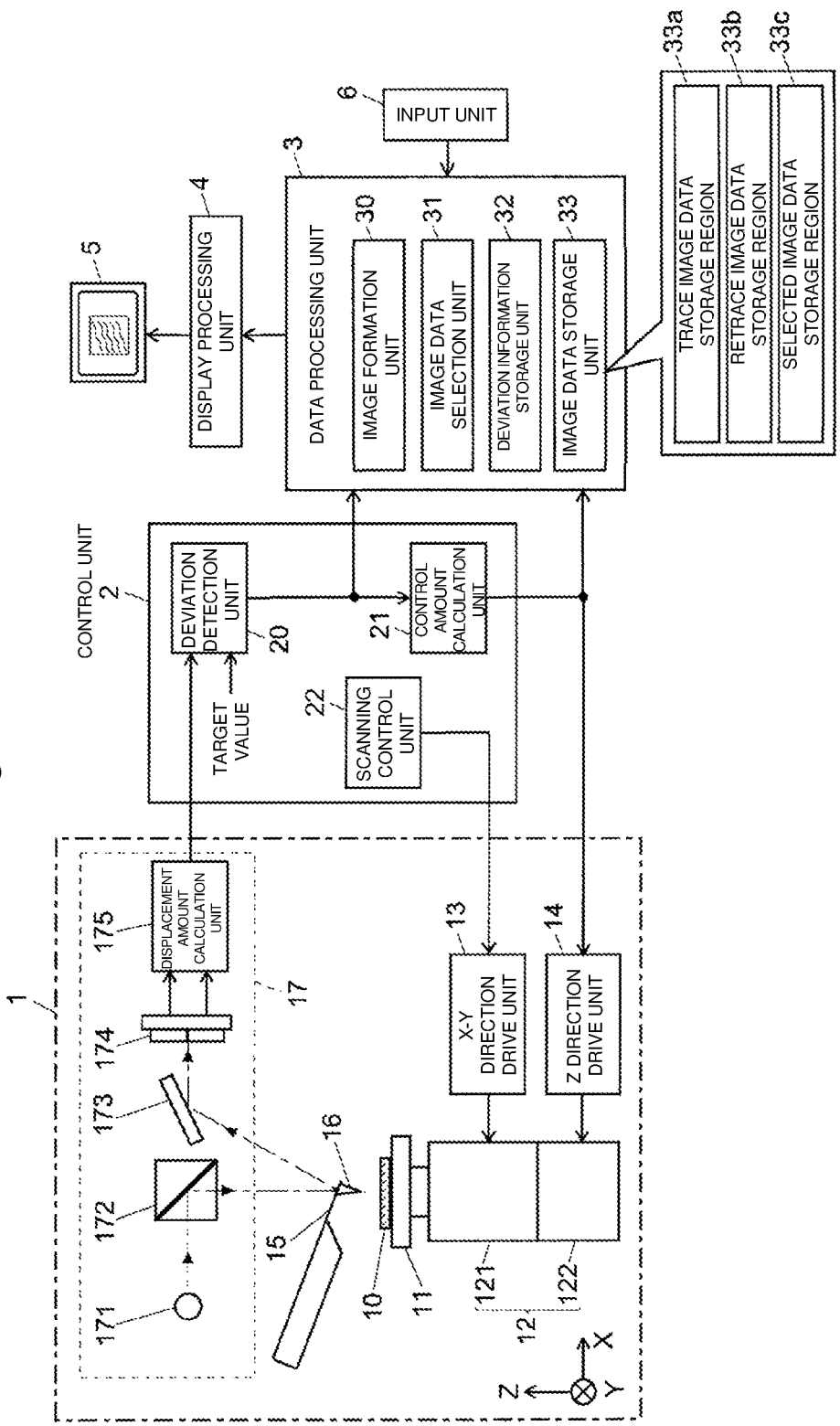
FIG. 1 is a configuration diagram of main components of an SPM according to a first embodiment of the present invention.

FIG. 1 is a configuration diagram of main components of the SPM of the first embodiment.

In a measurement unit 1, a sample 10 to be measured is mounted on a sample stage 11 disposed on a scanner 12. The scanner 12 includes: an XY-scanner 121 for moving the sample 10 in the two axial directions, i.e., the X-axis direction and the Y-axis direction, which are orthogonal to each other in a plane parallel to the top surface of the sample stage 11; and a Z-scanner 122 for finely moving the sample 10 in the Z-axis direction which is orthogonal to both the X axis and the Y axis. For each of the XY-scanner 121 and the Z-scanner 122, a piezoelectric element which produces displacement by a voltage applied respectively from an X-Y direction drive unit 13 and a Z direction drive unit 14 is provided as a drive source.

A flexible cantilever 15 having a probe 16 at its tip end is located above the sample 10 (in this case, at a position spaced apart in the Z-axis direction). For the detection of the displacement of the cantilever 15 in the Z-axis direction, an optical displacement detection unit 17 including a laser source 171, a half mirror 172, a mirror 173, a photodetector 174, and a displacement amount calculation unit 175 is provided above the cantilever 15. In the optical displacement detection unit 17, laser light emitted from the laser source 171 is reflected by the half mirror 172 to a generally vertically downward direction. The reflected light is radiated to a reflective surface provided at the back of the tip end of the cantilever 15. The light reflected by the reflective surface enters the photodetector 174 via the mirror 173. The photodetector 174 may be, for example, a four-segment photodetector having a light-receiving surface divided into four segments arrayed in the Z-axis and Y-axis directions. When the cantilever 15 is displaced in the Z-axis direction, a change occurs in the proportions of the amounts of light incident onto the plurality of light-receiving surface segments. The amount of displacement (amount of deflection) of the cantilever 15 is calculated by processing detection signals corresponding to the amounts of light received by the plurality of light-receiving surface segments.

The control unit 2 mainly controls measurement operation of the measurement unit 1 and is provided with a deviation detection unit 20, a control amount calculation unit 21, and a scanning control unit 22. The deviation detection unit 20 compares the displacement amount obtained in the displacement amount calculation unit 175 with a target value and detects the deviation between the displacement amount and the target value. The control amount calculation unit 21 calculates the control amount for driving the Z-scanner 122 so that the deviation may become zero, so as to control the operation of the Z-scanner 122 via the Z direction drive unit 14. On the other hand, the scanning control unit 22 controls the operation of the XY-scanner 121 via the X-Y direction drive unit 13 so that the sample 10 may move in the X-axis and Y-axis directions in a predetermined speed, direction, and order.

The data processing unit 3 includes functional blocks such as an image formation unit 30, an image data selection unit 31, a deviation information storage unit 32, and an image data storage unit 33, and displays measurement results such as the surface shape image of the sample on a screen of the display unit 5 via the display processing unit 4. Further, the data processing unit 3 is also connected to an input unit 6 with which a user performs suitable input or setting. Note that, the functional blocks included in the data processing unit 3 are embodied normally by allowing a personal computer to execute exclusive-use data processing software installed in the personal computer.

As is publicly well-known, in an SPM, observation of a sample surface shape can be made in two roughly classified modes, i.e., the contact mode and the dynamic mode. The SPM of the first embodiment performs observation of the sample surface shape in the contact mode. A configuration in which observation of the sample surface shape is performed in the dynamic mode will be separately described as the second embodiment.

The measurement operation in the SPM of the first embodiment will be described using FIGS. 2 to 4 in addition to FIG. 1.

When the cantilever 15 is brought close to the sample 10 by a drive mechanism (not illustrated) so that the tip end of the probe 16 may come to a position extremely close to the surface of the sample 10, an interatomic force (mainly a repulsive force in this case) acts between the probe 16 and the surface of the sample 10. In that state, the scanning control unit 22 drives the XY-scanner 121 via the X-Y direction drive unit 13 so that the inside of the measurement object region on the sample 10 may be two-dimensionally scanned with the probe 16.

Specifically, for example, as shown in FIG. 2(a), numerous linear scanning regions 101 extending in the X-axis direction and being parallel to the Y-axis direction are set in a rectangular measurement object region 100 on the sample 10. Further, as shown in FIG. 2(b), successively from the scanning region 101 that is located at an extreme end, scanning is carried out in the forward direction from one end 102 to the other end 102', and thereafter scanning is carried out on the same scanning region 101 in the reverse direction from the end 102' to the end 102 as the starting point. Subsequently, the scanning process proceeds to the adjacent next scanning region 101, and an operation of scanning on the scanning region 101 in the forward direction and in the reverse direction is carried out in the same manner. This is repeated for all the scanning regions 101 in the measurement object region 100. The forward scanning is referred to as trace, whereas the reverse scanning is referred to as retrace.

When the surface of the sample 10 is scanned with the probe 16 in the above-described manner, if there is a change in the elevation on the surface as shown in a cross-sectional view of FIG. 2(c), the deflection amount of the cantilever 15 changes in accordance with the elevation. When there is a change in the deflection amount of the cantilever 15, change occurs in the position at which the light reflected at the reflective surface on the back of the tip end of the cantilever 15 reaches the detection surface of the photodetector 174. In accordance with this change, the displacement amount that is output from the displacement amount calculation unit 175 changes. In the control unit 2, the deviation detection unit 20 determines the deviation between the displacement amount and the predetermined target value from moment to moment, and the control amount calculation unit 21 calculates the control amount of the Z-scanner 122 so that the deviation may become zero. Further, the Z direction drive unit 14 applies, to the Z-scanner 122, a voltage corresponding to the indicated control amount, so as to drive the Z-scanner to finely move the sample 10 in the Z-axis direction. When the sample 10 moves in the Z-axis direction, the deflection amount of the cantilever 15 thereby changes, so that the displacement amount obtained in the optical displacement detection unit 17 also changes.

Such feedback control in a closed loop including the sample 10, cantilever 15, optical displacement detection unit 17, deviation detection unit 20, control amount calculation unit 21, Z direction drive unit 14, and Z-scanner 122 allows the sample 10 to move in the Z-axis direction so that the repulsive force acting between the probe 16 and the sample 10 is kept constant, that is, so that the extremely small spacing distance between the probe 16 and the sample 10 is kept constant. The control amount calculated in the control amount calculation unit 21 reflects the fine change in the elevation on the surface of the sample 10, so that the data processing unit 3 records the control amount as image data.

As described above, each scanning region 101 in the measurement object region 100 is scanned for two times, i.e., in the forward direction and in the reverse direction, so that image data during forward scanning (which may hereinafter be referred to as "trace image data") and image data during reverse scanning (which may hereinafter be referred to as "retrace image data") are obtained for one measurement object region 100. The data processing unit 3 stores the control amount data, which is obtained in the above-described manner when the probe 16 scans on the surface of the sample 10, into the image data storage unit 33 by classifying the control amount data into the trace image data and the retrace image data, as it is or after a predetermined data processing is carried out. The image data storage unit 33 is provided with a storage region 33a where the trace image data is stored and a storage region 33b where the retrace image data is stored, so that the above image data are stored into respective storage regions 33a and 33b.

The measurement and processing operations described so far are the same as those of a conventional SPM.

The trace image and the retrace image are ideally the same because these are the results of scanning on the same scanning region 101 with the probe 16; however, this does not necessarily hold in actual cases. For example, if the shape of the probe 16 or the spring constant of the cantilever 15 differs between the forward scanning and the reverse scanning, the tracking property of the probe 16 along the change in the elevation on the surface of the sample 10 differs, giving rise to a difference in the image data on the same site. Also, besides such a difference specific to the device, if there is a steep change in the elevation on the surface of the sample 10, tracking delay may be generated or the tracking cannot be made in the feedback control of the Z-scanner 122, so that a temporary disturbance may be generated in the feedback control. Naturally, in such a case, it is not possible to obtain accurate image data.

FIG. 3 is a schematic diagram showing a state of image data obtained when a steep protrusion is present on the sample 10. It is assumed that a protrusion having a cross-section shown in FIG. 3(a) is present in the scanning region. In FIG. 3(b), the image data obtained during forward scanning is denoted with ■. In FIG. 3(c), the image data obtained during reverse scanning is denoted with ●. Also, the broken line in FIGS. 3(b) and 3(c) represents the actual position (height) of the surface of the sample 10. The left slope of this protrusion is a moderate slope, whereas the right slope of this protrusion is a steep slope, and moreover the inclination is steeper on the side near the apex part than in the base part. For this reason, substantially accurate image data along the surface of the sample 10 is obtained up to the apex part of the protrusion during forward scanning in which the probe 16 gradually ascends along the moderate slope, whereas the image data is greatly disturbed when the probe 16 passes the apex part and begins to descend along the steep slope. On the other hand, during reverse scanning in which the probe 16 ascends along the steep slope, the image data starts to become inaccurate in the middle of the ascent, and the image data obtained at the apex part is greatly different from that of the actual surface of the sample 10. Although not illustrated herein, the image data is greatly disturbed in the same manner when a recess having a steep slope is scanned with the probe 16.

In both of the trace image and the retrace image, accurate image data is not obtained near the elevation such as shown above; however, in order to create an image more accurately reflecting the recess/protrusion shape of the sample surface, there is a need to select image data that is closer to the actual height of the sample surface. Accordingly, in the SPM of the first embodiment, more accurate image data is collected in the following manner and stored in the image data storage unit 33.

As described above, in parallel with the obtainment of the image data by scanning the surface of the sample 10 with the probe 16, the deviation information storage unit 32 obtains the deviation calculated by the deviation detection unit 20, that is, the deviation data representing the amount of difference between the displacement amount of the position at which the reflected light reaches on the detection surface of the photodetector 174 corresponding to the deflection amount of the cantilever 15 and the target value, from moment to moment and stores the same in correspondence with the position of the measurement point. Therefore, when trace image data and retrace image data are determined for one measurement object region 100, the deviation data with respect to the trace image data and the deviation data with respect to the retrace image data are also determined in parallel.

The deviation obtained in the deviation detection unit 20 accurately shows the difference between the ideal position and the actual position of the cantilever 15 in the Z-axis direction at that time point. For this reason, it is inferred that the smaller this deviation is, the higher the accuracy of the image data is. Accordingly, after all the image data are obtained, the image data selection unit 31 compares the deviation during forward scanning and the deviation during reverse scanning that are obtained for the same measurement point on the sample 10 with respect to the deviation data stored in the deviation information storage unit 32. Further, the image data obtained during scanning with a smaller deviation is selected as the image data for that measurement point. Such a selection process of the image data is carried out respectively for all the measurement points in each scanning region 101 within the measurement object region 100. In other words, at each of all the measurement points on which the image data is obtained, the trace image data is selected when the deviation during forward scanning is smaller than the deviation during reverse scanning, whereas the retrace image data is selected when the deviation during reverse scanning is smaller than the deviation during forward scanning. Further, the image data (either the trace image data or the retrace image data) selected for each measurement point is stored into the selected image data storage region 33c of the image data storage unit 33.

One example of the deviation data obtained in parallel at the time of obtaining the image data shown in FIG. 3 is shown in FIG. 4(a). In this example, the deviation during forward scanning suddenly increases after the probe 16 passes the apex part of the protrusion, and exceeds the deviation during reverse scanning. For this reason, as shown in FIG. 4(b), the trace image data is selected on the left slope of the protrusion including the apex part, whereas the retrace image data is selected on the right slope of the protrusion excluding the apex part. As described above, the deviation accurately shows the difference between the ideal height (that is, the target value) and the actual height of the cantilever 15 in the Z-axis direction at each measurement point, so that, by a process such as mentioned above, the image data closer to the actual height of the sample 10 is selected from among the trace image data and the retrace image data and can be stored into the selected image data storage region 33c.

For example, when the user gives an instruction to display the selected image from the input unit 6, the image formation unit 30 reads the selected image data out from the selected image data storage region 33c of the image data storage unit 33, forms a sample surface shape image based on the data, and displays the same on the screen of the display unit 5 via the display processing unit 4. Thus, it is possible to display an image more accurately reflecting the actual surface shape of the sample than the sample surface shape image based on the trace image data or the sample surface shape image based on the retrace image data. It goes without saying that, in accordance with an instruction from the input unit 6, it is also possible to display, on the screen of the display unit 5, the sample surface shape image based on the trace image data, the sample surface shape image based on the retrace image data, or the sample surface shape image based on average image data determined by taking an average of the trace image data and the retrace image data for each measurement point.

In the above description, the deviation data determined in parallel with the image data is once stored in the deviation information storage unit 32 and, after all the image data on the measurement object region 100 are obtained, the selection process of the image data is carried out using the deviation data stored in the above storage unit 32; however, if the processing time can be ensured, selection of the image data can be carried out using the deviation data during the obtainment of the image data. If such a process is possible, there is no need to store the deviation data for the whole measurement object region 100, and it is sufficient that the SPM is provided with a buffer that temporarily holds up to several pieces of deviation data.

Second Embodiment

Figure 5:
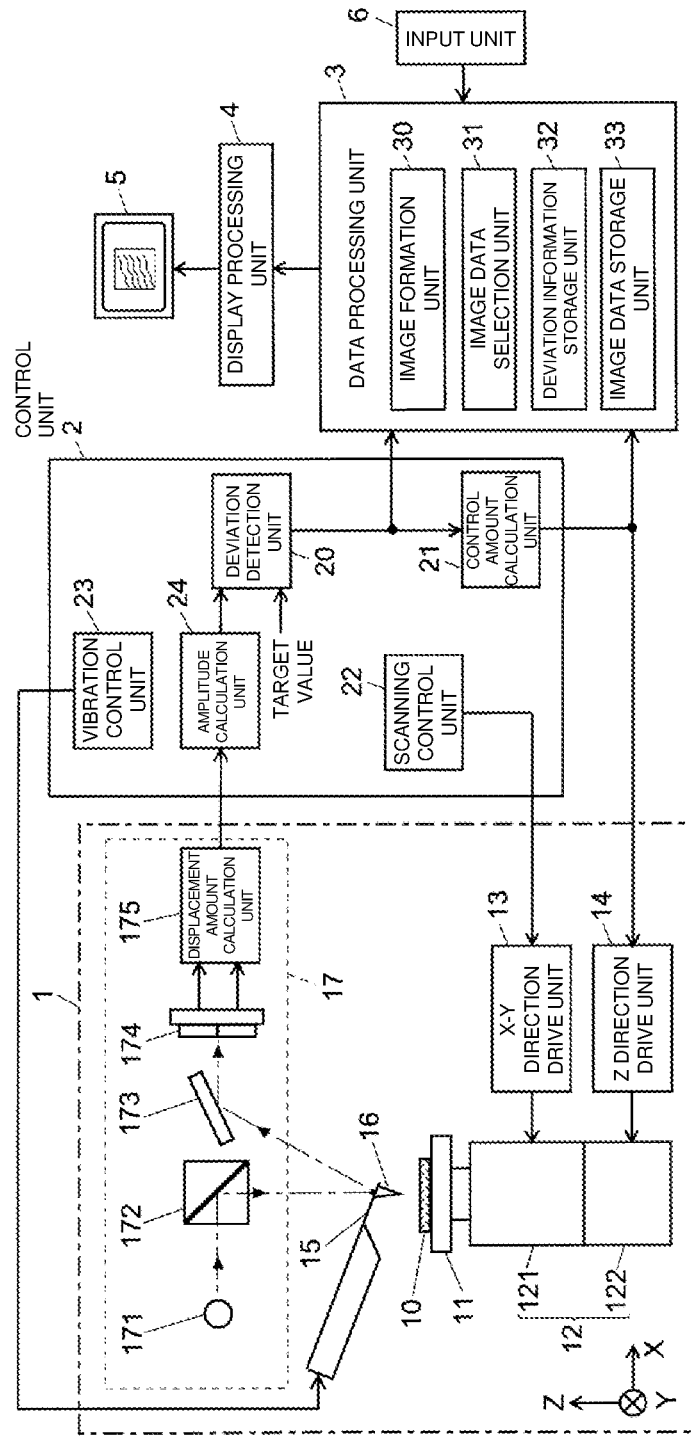
FIG. 5 is a configuration diagram of main components of an SPM according to a second embodiment of the present invention.

FIG. 5 is a configuration diagram of main components of an SPM of the second embodiment. Constituent elements identical to or corresponding to those of the SPM of the first embodiment described above are denoted with the same reference numerals, and detailed descriptions of those elements will be omitted unless specifically needed. This SPM performs sample surface shape measurement in the dynamic mode. For that purpose, a vibration control unit 23 drives a not-illustrated piezoelectric element attached to the cantilever 15, so as to vibrate the cantilever 15 at a predetermined frequency. Further, an amplitude calculation unit 24 determines the amplitude of the vibration of the cantilever 15 during the above vibration based on the displacement amount obtained in the displacement amount calculation unit 175. The deviation detection unit 20 determines the deviation between the vibration amplitude and a target value of the amplitude, and feedback control is carried out so that this deviation may become zero.

In the same manner as in the first embodiment described above, the deviation data obtained from the deviation detection unit 20 at the time of obtaining the image data accurately shows the difference between the ideal height (that is, the target value) and the actual height of the cantilever 15 in the Z-axis direction. Therefore, in the SPM of the second embodiment, the deviation obtained during forward scanning and the deviation obtained during reverse scanning at each measurement point may be compared, and the trace image data and the retrace image data may be selected on the basis of the deviations, in the same manner as in the SPM of the first embodiment.

Third Embodiment

In the first and second embodiments, the trace image data and the retrace image data are selected using the deviation determined in a closed loop that performs feedback control of the Z-scanner 122 for the sample surface shape measurement; however, instead of the deviation, another data reflecting the physical property information of the sample surface that can be obtained in the SPM may be used to select image data having a high accuracy.

Figure 6:
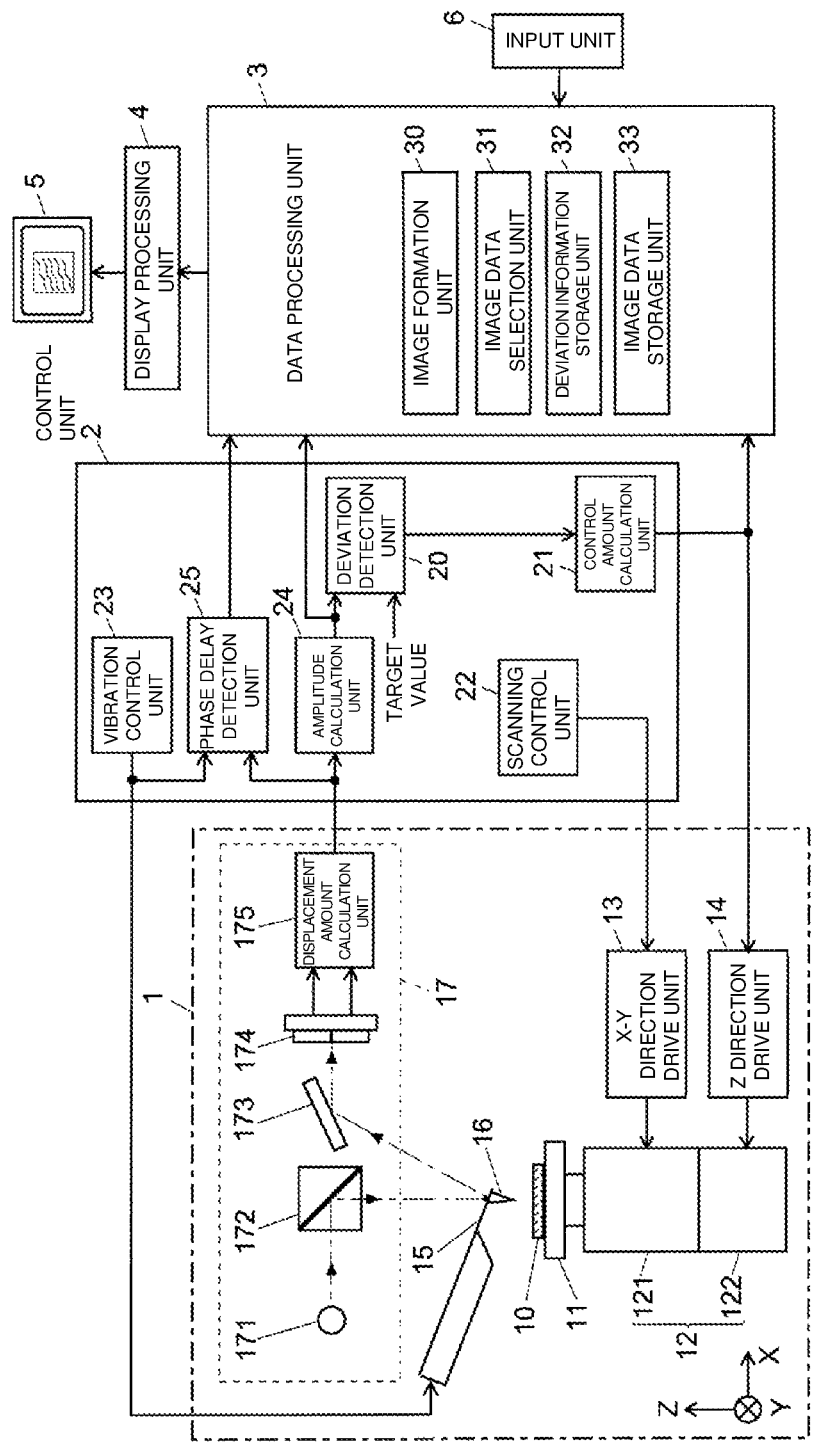
FIG. 6 is a configuration diagram of main components of an SPM according to a third embodiment of the present invention.

FIG. 6 is a configuration diagram of main components of an SPM of the third embodiment. In this SPM, selection of the image data is carried out using the data obtained by the measurement in the phase mode that can be carried out in parallel with the sample surface shape measurement by the dynamic mode.

In other words, in order to perform measurement by the phase mode, a phase delay detection unit 25 detects a delay amount of the phase of the detection signal relative to a sinusoidal wave signal that vibrates the cantilever 15. This phase delay is dependent on the viscoelasticity or the like on the surface of the sample 10. The larger the difference between the ideal height and the actual height of the cantilever 15 in the Z-axis direction is, the larger the phase delay amount is. Accordingly, in this SPM, the phase delay amount is used instead of the deviation. In other words, the deviation information storage unit 32 stores the phase delay amount data obtained in parallel during obtainment of the image data for each measurement point, and the image data selection unit 31 compares the phase delay amount data obtained during forward scanning and the phase delay amount data obtained during reverse scanning for each measurement point, selects the image data during scanning that has the smaller value, and stores the same as the selected image data. This produces the same effect as in the SPM of the first and second embodiments.

Also, as another embodiment, selection of the image data can be carried out using the data obtained by the measurement in the horizontal force mode that can be carried out in parallel with the sample surface shape measurement by the contact mode. In the horizontal force mode, the horizontal force (frictional force) that acts between the probe 16 and the sample 10 is detected as torsion of the cantilever 15 while the cantilever 15 is being moved in a direction perpendicular to the longitudinal direction of the cantilever 15 in the contact mode. The displacement amount calculation unit 175 performs a calculation process on the detection signals respectively obtained from the four detection surfaces of the photodetector 174, so as to determine the displacement amount corresponding to the torsion. The larger the difference between the ideal height and the actual height of the cantilever 15 in the Z-axis direction is, the larger this displacement amount is. Accordingly, selection of the data from among the trace image data and the retrace image data may be carried out for each measurement point by using this displacement amount instead of the deviation.

Also, in all of the embodiments described above, a process of selecting more accurate image data is carried out from the trace image data and the retrace image data in the sample surface shape measurement. However, in addition to this, more accurate data may be selected from the data obtained during forward scanning and the data obtained during reverse scanning in the phase mode or the horizontal force mode described above, or various measurement modes other than these, such as the force modulation mode, the electric current mode, and the surface electric potential mode, that are prepared normally or as an option in the SPM. This can improve the accuracy of not only the sample surface shape images but also various images indicating the physical property information of the sample surface, such as the phase image, that are obtained in parallel with this even if there is a steep change in the elevation on the sample 10 and the feedback control of the distance between the probe 16 and the sample 10 cannot be appropriately carried out.

Furthermore, each of the embodiments described above is one example of the present invention, and needless to say, suitable changes, modifications, and additions made within the range of the gist of the present invention are all encompassed within the scope of the claims of the present application.

The invention claimed is:

1. A scanning probe microscope comprising: a cantilever provided with a probe; and
a displacement detection unit for detecting displacement of the cantilever,
the scanning probe microscope configured to, in a state in which the probe is brought close to a surface of a sample, scan a measurement object region on the sample with the probe while performing feedback control of a spacing distance between the probe and the sample so that an interaction between the probe and the sample is kept constant based on the displacement detected by the displacement detection unit, to obtain a surface shape image of the region,
wherein the scanning probe microscope comprises:
a) a data obtaining unit for obtaining image data in a forward scanning and image data in a reverse scanning by moving a relative position of the probe and the sample so as to scan a predetermined one-dimensional region in the measurement object region on the sample in a forward direction and in a reverse direction, respectively;
b) a reference information obtaining unit for obtaining, as reference information, at least one of a deviation between a displacement amount obtained based on the displacement detection unit and a target value, and a signal value reflecting physical property information of the sample surface obtained based on the displacement amount in a control loop of the feedback control in obtaining the image data by the data obtaining unit; and
c) an image data selection processing unit for determining the image data corresponding to the measurement object region by executing, at each of measurement points in the measurement object region, a process of comparing the reference information obtained during the forward scanning and the reference information obtained during the reverse scanning at each measurement point, and selecting the image data obtained during scanning in which a reference value indicated by the reference information is the smaller between the forward scanning image data and the reverse scanning image data.

2. The scanning probe microscope according to claim 1, wherein the reference information obtaining unit obtains, as the reference information, the deviation between the displacement amount obtained based on the displacement detection unit and the target value of the displacement amount.

3. The scanning probe microscope according to claim 1, wherein sample surface shape observation is made by a dynamic mode, and
the reference information obtaining unit obtains, as the reference information, a deviation between a vibration amplitude of a detection signal obtained based on the displacement detection unit and a target value of the amplitude when the cantilever is vibrated at a predetermined frequency.

4. The scanning probe microscope according to claim 1, wherein physical property information of the sample surface is obtained by a phase mode, and
the reference information obtaining unit obtains, as the reference information, a phase delay amount of a detection signal obtained based on the displacement detection unit relative to a vibration signal when the cantilever is vibrated at a predetermined frequency.

5. The scanning probe microscope according to claim 1, wherein physical property information of the sample surface is obtained by a horizontal force mode, and the reference information obtaining unit obtains, as the reference information, displacement amount reflecting a degree of torsion of the cantilever obtained based on the displacement detection unit when the cantilever and the sample are relatively moved in a direction orthogonal to a longitudinal direction of the cantilever.

* * * * *